United States Patent
Rangarajan et al.

(10) Patent No.: US 9,391,800 B2
(45) Date of Patent: Jul. 12, 2016

(54) DYNAMIC AND INTEROPERABLE GENERATION OF STATEFUL VPN CONNECTION PROFILES FOR COMPUTING DEVICES

(71) Applicant: Microsoft Corporation, Redmond, WA (US)

(72) Inventors: Sandeep Rangarajan, Seattle, WA (US); Harish Srinivasan, Sammamish, WA (US); Yogesh Raju Sreenivasan, Bothell, WA (US); Rao Venkateswara Salapaka, Sammamish, WA (US); Vu Phan Hoang Nguyen, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/206,629

(22) Filed: Mar. 12, 2014

(65) Prior Publication Data

US 2015/0263865 A1 Sep. 17, 2015

(51) Int. Cl.
*H04L 12/24* (2006.01)
*H04L 12/751* (2013.01)
*H04L 12/46* (2006.01)
*H04L 29/06* (2006.01)

(52) U.S. Cl.
CPC ........ *H04L 12/4633* (2013.01); *H04L 63/0272* (2013.01); *H04L 63/20* (2013.01)

(58) Field of Classification Search
CPC ................................ H04L 41/12; H04L 45/02
USPC ........................................................ 370/254
See application file for complete search history.

(56) References Cited

U.S. PATENT DOCUMENTS

| 7,392,323 B2 | 6/2008 | Yim et al. |
| 7,881,215 B1 | 2/2011 | Daigle et al. |
| 7,930,410 B2 | 4/2011 | Degenkolb et al. |

(Continued)

FOREIGN PATENT DOCUMENTS

| KR | 2013016749 A | * | 2/2013 | ............... H04L 9/32 |
| WO | 2005076726 A2 | | 8/2005 | |

OTHER PUBLICATIONS

International Search Report and Written Opinion Issued in PCT Patent Application No. PCT/US2015/019344, Mail Date: May 21, 2015, 11 Pages.

(Continued)

*Primary Examiner* — Ronald B Abelson
(74) *Attorney, Agent, or Firm* — Miia Sula; Micky Minhas

(57) ABSTRACT

Systems, methods, apparatuses, and computer program products are described herein that enable a computing device to dynamically generate virtual private network (VPN) connection profiles to which policies can be mapped and then subsequently enforced. The VPN connection profiles are dynamically generated by a translation engine by obtaining parameters from payloads received from a plurality of different VPN gateways pursuant to establishing connections therewith in accordance with a respective plurality of different tunneling protocols, which may include both standard and proprietary tunneling protocols. The dynamically-generated VPN connection profiles are then provided to a connection manager, which enforces any policies associated with the VPN connection profiles when servicing requests for connections received from applications running on the computing device.

20 Claims, 10 Drawing Sheets

(56) References Cited

U.S. PATENT DOCUMENTS

| | | |
|---|---|---|
| 8,397,282 B2 | 3/2013 | Turley et al. |
| 8,509,095 B2 | 8/2013 | Ormazabal |
| 8,516,567 B2 | 8/2013 | Poola et al. |
| 8,526,306 B2 | 9/2013 | Jungck et al. |
| 2005/0227670 A1 | 10/2005 | Bicker |
| 2010/0103837 A1 | 4/2010 | Jungck et al. |
| 2013/0055336 A1 | 2/2013 | Li et al. |
| 2013/0298182 A1 | 11/2013 | May |

OTHER PUBLICATIONS

"Second Written Opinion Issued in PCT Application No. PCT/US2015/019344", Mailed Date: Jan. 26, 2016, 6 Pages.

"International Preliminary Report on Patentability Issued in PCT Application No. PCT/US2015/019344", Mailed Date: Apr. 26, 2016, 7 Pages.

* cited by examiner

| HOST/IP | TRIGGER | CONNECTION | ROAM_ALLOW | COST_ALLOW |
|---|---|---|---|---|
| 10.0.1.0/26 | Auto-triggered | VPN | NO | ANY |
|  |  |  |  |  |
| 10.0.2.1/32 | Auto-triggered | VPN | YES | ANY |
| 10.0.3.0/24 |  | VPN | NO | LOW |

FIG. 5

| HOST/IP | TRIGGER | CONNECTION | ROAM_ALLOW | COST_ALLOW |
|---|---|---|---|---|
| Lync.redmond.corp.ms.com | Auto-triggered | VPN | NO | LOW |
| *.corp.ms.com | Auto-triggered | VPN | NO | LOW |
| 10.1.0.0/24 | Auto-triggered | VPN | NO | ANY |
| Maps.bing.com |  | Wi-Fi | YES | ANY |
| mms.com |  | MMS | YES | ANY |

FIG. 6

| CONNECTION | CELL/WIFI | COST | ROAM |
|---|---|---|---|
| VPN | YES | HIGH | NO |
| MMS | YES | ZERO | NO |

FIG. 7

| CONNECTION | CELL/WIFI | COST | ROAM |
|---|---|---|---|
| VPN | YES | HIGH | YES |
| MMS | YES | ZERO | YES |

FIG. 8

DYNAMIC AND INTEROPERABLE GENERATION OF STATEFUL VPN CONNECTION PROFILES FOR COMPUTING DEVICES

BACKGROUND

A virtual private network (VPN) enables a computing device to exchange data with a private network across a shared or public network, such as the Internet, while benefiting from the functionality, security and management policies of the private network. To implement a VPN, a computing device establishes a secure connection over a shared or public network with a VPN gateway that is typically provided at the edge of a private network. A tunneling protocol is typically used to implement the connection between the remote computing device and the VPN gateway.

A VPN connection may be established using any of a variety of standard tunneling protocols such as, for example, the Layer 2 Tunneling Protocol (L2TP), the Internet Key Exchange protocol (IKE or IKEv2), the Point-to-Point Tunneling Protocol (PPTP), and the Secure Sockets Tunneling Protocol (SSTP). Different VPN gateways may support different ones of these standard tunneling protocols. By providing a computing device with the ability to support a variety of such standard tunneling protocols, interoperability between the computing device and a variety of different standards-based VPN gateways can be ensured.

Currently, in order to implement standard tunneling protocols on computing devices, static connection profiles must first be provisioned to the computing devices. If the computing devices are mobile devices, this may entail providing additional mobile device management (MDM) infrastructure to perform the provisioning. This may also entail requiring users to perform complex interaction steps to get up and running with their remote access or site-to-site VPN experiences. Furthermore, in conventional implementations, higher-layer policies, such as tariff-based policies and multi-network connection routing policies, cannot be enforced on these static connection profiles.

As an alternate approach to pushing static connection profiles to computing devices, some vendors have pushed the industry towards proprietary tunneling protocols to enable a simpler connectivity experience enabled through the dynamic exchange of proprietary session parameters between a computing device and a VPN gateway. However, this type of approach fundamentally breaks the principle of interoperability between computing devices and VPN gateways that implement standard tunneling protocols.

SUMMARY

Systems, methods, apparatuses, and computer program products are described herein that enable a computing device to dynamically generate virtual private network (VPN) connection profiles to which policies, such as tariff-based policies and multi-network connection policies, can be mapped and then subsequently enforced. In accordance with embodiments, the VPN connection profiles are dynamically generated by a translation engine by obtaining parameters from payloads received from a plurality of different VPN gateways pursuant to establishing connections therewith in accordance with a respective plurality of different tunneling protocols, which may include both standard and proprietary tunneling protocols. The dynamically-generated VPN connection profiles are then provided to a connection manager, which enforces any policies associated with the VPN connection profiles when servicing requests for connections received from applications running on the computing device. The policies associated with the VPN connection profiles may advantageously include a policy that indicates that a particular VPN connection should be automatically established (also referred to herein as auto-triggering).

In particular, a system implemented on a computing device is described herein. The system includes at least one processor and memory that is accessible by the at least one processor. The memory stores components for execution by the at least one processor. The components include a translation engine and a connection manager. The translation engine is operable to obtain parameters from payloads received from a plurality of different VPN gateways pursuant to establishing connections therewith in accordance with a respective plurality of different tunneling protocols. The translation engine is further operable to generate a plurality of VPN connection profiles based on the parameters. Each VPN connection profile includes a connection target identifier (e.g., a hostname or an Internet Protocol (IP) address) and one or more connection policies associated therewith. The connection manager is operable to receive the VPN connection profiles generated by the translation engine and to enforce the connection polices associated therewith.

In one embodiment of the system, the plurality of different tunneling protocols includes a plurality of standard tunneling protocols, a plurality of proprietary tunneling protocols, or a combination of standard and proprietary tunneling protocols. The standard tunneling protocols may include one or more of a Layer 2 Tunneling Protocol, an Internet Key Exchange Protocol, a Point-to-Point Tunneling Protocol, a Secure Sockets Tunneling Protocol, and an OpenVPN Tunneling Protocol.

In another embodiment of the system, at least one of the payloads is received from one of the VPN gateways as part of a dynamic key exchange protocol.

In yet another embodiment of the system, the one or more connection policies includes at least one policy that specifies whether or not a connection should be automatically established, whether or not a connection should be established when the computing device is roaming, whether or not a connection should be established over a particular network type, whether or not a connection should be established based on a cost metric, whether or not a connection should be established over a trusted network, and an identity of a proxy server to which data sent over the connection should be sent.

In a further embodiment of the system, the connection manager is operable to enforce the connection policies associated with each VPN connection profile by receiving a request for a connection from an application executing on the computing device and determining if a VPN connection profile should be used to service the request by determining if using the VPN connection profile would violate any of the connection policies associated therewith.

The system may also include one or more of: a user interface component operable to enable a user of the computing device to specify one or more connection policies to be associated with one or more of the VPN connection profiles, a configuration service provider component operable to receive from a system administrator one or more connection policies to be associated with one or more of the VPN connection profiles, and an operating system component operable to determine a state of the computing device and to specify one or more connection policies to be associated with one or more of the VPN connection profiles based on the state of the computing device. The aforementioned state of the computing device may include one or more of a data utilization state of the computing device, an operational state of the computing device, and a power supply state of the computing device.

A method performed by a computing device is also described herein. In accordance with the method, a connection policy is received. The connection policy is then associated with one or more of a plurality of VPN connection profiles, each of the plurality of VPN connection profiles being dynamically generated by the computing device when connecting to a different VPN gateway. The connection policy is then enforced when determining whether to establish a connection in accordance with the one or more VPN connection profiles.

In one embodiment of the method, receiving the connection policy includes receiving the connection policy from a user via a user interface component of the computing device, receiving the connection policy from a system administrator via a configuration service provider component of the computing device, or receiving the connection policy from an operating system component of the computing device, the connection policy being provided by the operating system component based on a determined state of the computing device. The determined state of the computing device may include one or more of a data utilization state of the computing device, an operational state of the computing device, and a power supply state of the computing device.

In another embodiment of the method, the connection policy specifies whether or not a connection should be automatically established, whether or not a connection should be established when the computing device is roaming, whether or not a connection should be established over a particular network type, whether or not a connection should be established based on a cost metric, whether or not a connection should be established over a trusted network, or an identity of a proxy server to which data sent over the connection should be sent.

In yet another embodiment of the method, each of the plurality of VPN connection profiles is dynamically generated by the computing device by obtaining one or more parameters from one or more payloads received from each of the different VPN gateways pursuant to establishing a connection therewith in accordance with a different tunneling protocol. The different tunneling protocols may include a plurality of standard tunneling protocols, a plurality of proprietary tunneling protocols, or a combination of standard and proprietary tunneling protocols. The standard tunneling protocols may include one or more of a Layer 2 Tunneling Protocol, an Internet Key Exchange Protocol, a Point-to-Point Tunneling Protocol, a Secure Sockets Tunneling Protocol, and an OpenVPN Tunneling Protocol.

A computer program product is also described herein. The computer program product includes a computer-readable memory having computer program logic recorded thereon that when executed by at least one processor causes the at least one processor to perform operations. The computer program logic includes first computer program logic, second computer program logic and third computer program logic. When executed by the at least one processor, the first computer program logic causes the at least one processor to dynamically generate a VPN connection profile based on configuration parameters obtained from a VPN gateway pursuant to establishing a connection therewith in accordance with a particular tunneling protocol. When executed by the at least one processor, the second computer program logic causes the at least one processor to associate a policy with the VPN connection profile that indicates that VPN connections should be automatically established. When executed by the at least one processor, the third computer program logic causes the at least one processor to automatically establish a VPN connection with the VPN gateway based on the policy associated with the VPN connection profile.

In one embodiment of the computer program product, the policy indicates that VPN connections should be automatically established based on one or more of an application or process identifier, an IP address associated with the VPN gateway, a hostname associated with the VPN gateway, or a short name associated with the VPN gateway.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 5 is a table that includes examples of dynamically-generated VPN connection profiles in accordance with an embodiment.

FIG. 6 is a table that includes further examples of dynamically-generated VPN connection profiles in accordance with an embodiment.

FIG. 7 is a table of connection characteristics that can be compared to connection policies associated with dynamically-generated VPN connection profiles to determine whether or not to allow an application to use a connection in accordance with an embodiment.

FIG. 8 is another table of connection characteristics that can be compared to connection policies associated with dynamically-generated VPN connection profiles to determine whether or not to allow an application to use a connection in accordance with an embodiment.

Figure 1:
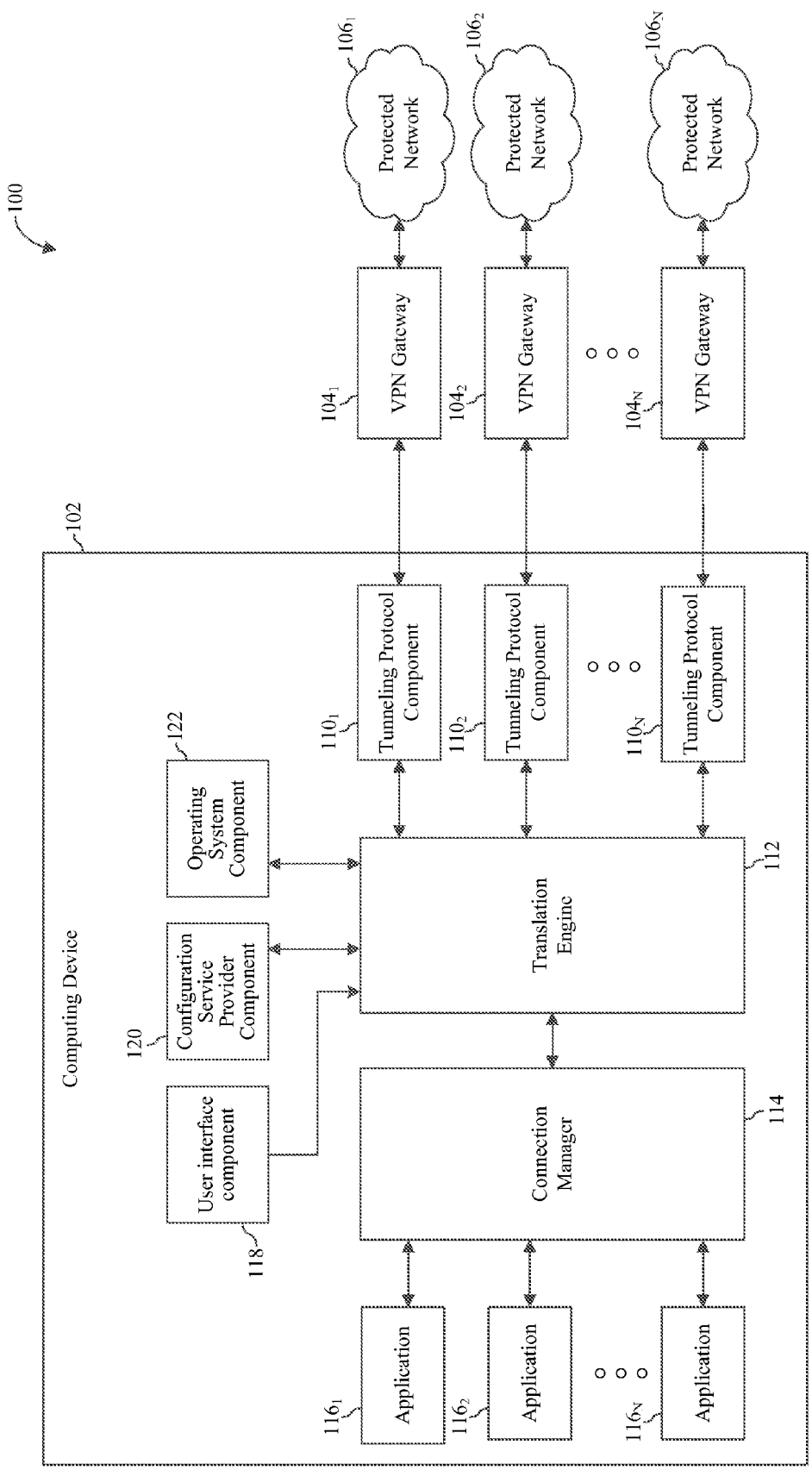
FIG. 1 is a block diagram of a system that includes a computing device that generates stateful virtual private network (VPN) connection profiles in a dynamic and interoperable manner and utilizes the same for connection management in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Systems, methods, apparatuses, and computer program products are described herein that enable a computing device to dynamically generate virtual private network (VPN) connection profiles to which policies, such as tariff-based policies and multi-network connection policies, can be mapped and then subsequently enforced. In accordance with embodiments, the VPN connection profiles are dynamically generated by a translation engine by obtaining parameters from payloads received from a plurality of different VPN gateways pursuant to establishing connections therewith in accordance with a respective plurality of different tunneling protocols, which may include both standard and proprietary tunneling protocols. The dynamically-generated VPN connection profiles are then provided to a connection manager, which enforces any policies associated with the VPN connection profiles when servicing requests for connections received from applications running on the computing device. The policies associated with the VPN connection profiles may advantageously include a policy that indicates that a particular VPN connection should be automatically established (also referred to herein as auto-triggering).

In an embodiment, a computing device includes a "universal" client that is configured to interoperate with a variety of different VPN gateways using a variety of different standard and/or proprietary tunneling protocols. Such computing device utilizes novel post-processing techniques to convert what are essentially stateless packet filters that have been dynamically negotiated between the universal client and the different VPN gateways into stateful "logically abstracted" VPN connection profiles with which policies may be associated. The post-processing logic may be configured to operate upon payloads received from any of a variety of standard and proprietary VPN gateways. The association of policies with the VPN connection profiles and the application of such policies to connection establishment and automatic connection triggering can advantageously be carried out in a manner that is independent of the underlying tunneling protocols utilized to establish VPN connections.

In accordance with further embodiments, higher-layer context-based policies can be easily applied to these dynamically-obtained VPN connection profiles without complex configuration, to enforce tariff awareness (e.g., roaming, under/on-track/over data limit), proxy policies, or network routing preferences (e.g., WiFi, cellular, or both). As a result, application traffic can be intelligently routed over protected tunnels, while being subject to sophisticated policies that can restrict application flows to be routed to specific networks (e.g., WiFi, cellular or both), tariff-cost aware, or restricted due to cost (over data limit, or roaming), all without requiring a profile to be manually pushed or any user interaction. This is ideal for enterprises that follow a "bring your own device" (BYOD) policy.

In still further embodiments, the dynamically-generated VPN connection profiles can be used to enable auto-triggering of a VPN connection based on various factors such as the identity of a calling application/process or the identity of the connection target (e.g., a hostname, Internet Protocol (IP) address, or shortname associated with the connection target), without any additional configuration. In accordance with such embodiments, the user does not have to think about manually connecting to the VPN before accessing an application, but instead protected applications can drive the auto-triggering behavior of VPN connections.

The techniques described herein may advantageously be applied to in both remote access and site-to-site VPN configurations, enabling both types of deployments to benefit from the application of higher-layer context-specific policies to dynamically-generated VPN profiles, thereby enabling more intelligent and cost-efficient routing.

Section II describes an example system that generates stateful VPN connection profiles in a dynamic and interoperable manner and that utilizes the same for connection management in accordance with an embodiment, as well as associated methods. Section III describes an example mobile device that may be used to implement features described herein. Section IV describes an example desktop computer that may be used to implement features described herein. Section V provides some concluding remarks.

II. Example System and Methods for Generating and Utilizing Stateful VPN Connection Profiles FIG. 1 is a block diagram of an example system 100 system that includes a computing device 102 that generates stateful virtual private network (VPN) connection profiles in a dynamic and interoperable manner and utilizes the same for connection management in accordance with an embodiment.

Computing device 102 is generally intended to represent a processor-based electronic device that is capable of running applications and exchanging data on behalf of such applications with a protected network via a VPN connection. In one embodiment, computing device 102 comprises a mobile computing device such as a mobile phone (e.g., a smart phone), a laptop computer, a tablet computer, or a netbook. Computing device 102 may conceivably comprise other types of mobile computing devices such as a wearable computer (e.g., a head-mounted computer), a portable media player, a personal digital assistant, a personal navigation assistant, a handheld game console, or any other mobile device capable of running applications and exchanging data on behalf of such applications with a protected network via a VPN connection. One example of a mobile device that may incorporate the functionality of computing device 102 will be discussed below in reference to FIG. 11. In another embodiment, computing device 102 comprises a desktop computer or other non-mobile computing platform that is capable of running applications and exchanging data on behalf of such applications with a protected network via a VPN connection. An example desktop computer that may incorporate the functionality of computing device 102 will be discussed below in reference to FIG. 12.

As shown in FIG. 1, in addition to computing device 102, system 100 also includes a plurality of VPN gateways $104_1$-$104_N$. Each VPN gateway $104_1$-$104_N$ is configured to perform operations that enable remote computing devices, such as computing device 102, to exchange data with a corresponding protected network $106_1$-$106_N$ over a public or shared network while benefiting from functionality, security and management policies of the corresponding protected network $106_1$-$106_N$. Although each of VPN gateways $104_1$-$104_N$ is shown as being connected to a corresponding protected network in FIG. 1, it is to be understood that two or more of the VPN gateways may be connected to the same protected network. In one embodiment, each VPN gateway $104_1$-$104_N$ comprises a network appliance (e.g., a server). However, that example is not intended to be limiting, and each VPN gateway $104_1$-$104_N$ can be implemented using any suitable form of physical device. For example, at least one of VPN gateways $104_1$-$104_N$ may comprise a mobile device providing access to a peer that is trying to connect to it.

More particularly, each VPN gateway $104_1$-$104_N$ is configured to establish secure VPN connections with remote devices and manage tunnels used to implement such secure connections. In FIG. 1, each VPN gateway $104_1$-$104_N$ supports a different tunneling protocol for implementing VPN connections. For example, VPN gateway $104_1$ may support a first standard tunneling protocol, such as the Layer 2 Tunneling Protocol (L2TP) (version 3 of which is specified in Request for Comments (RFC) 3931), VPN gateway $104_2$ may support a second standard tunneling protocol, such as the Internet Key Exchange (IKE) protocol (e.g., either IKE, which is specified in RFC 2407, 2408 and 2409, or IKEv2, which is specified in RFC 4306 and 4718), and VPN gateway $104_N$ may support the Point-to-Point Tunneling Protocol (PPTP) (as specified in RFC 2637). Any one of VPN gateways $104_1$-$104_N$ may also support the Secure Sockets Tunneling Protocol (SSTP), an OpenVPN Tunneling Protocol or any other standards-based tunneling protocol, whether currently in existence or subsequently developed. In addition, at least one of VPN gateways $104_1$-$104_N$ may support a proprietary tunneling protocol, whether currently in existence or subsequently developed. For example, a number of proprietary tunneling protocols have been developed over cryptographic protocols such as Secure Sockets Layer (SSL).

To maximize interoperability with VPN gateways $104_1$-$104_N$, computing device includes a plurality of tunneling protocol components $110_1$-$110_N$. Each of these tunneling protocol components is capable of carrying out the lower-layer communications necessary to establish a tunnel with a VPN gateway in accordance with a different tunneling protocol. Thus, for example, first tunneling protocol component $110_1$ may be operable to carry out the lower-layer communications necessary to establish a tunnel with VPN gateway $104_1$ using L2TP, second tunneling protocol component $110_2$ may be operable to carry out the lower-layer communications necessary to establish a tunnel with VPN gateway $104_2$ using IKEv2, and nth tunneling protocol component $110_N$ may be operable to carry out the lower-layer communications necessary to establish a tunnel with VPN gateway $104_N$ using PPTP. Any one of tunneling protocol components $110_1$-$110_N$ may also be operable to carry out the lower-layer communications necessary to establish a tunnel with a VPN gateway using SSTP, OpenVPN, or any other standards-based tunneling protocol. In addition, any one of tunneling protocol components $110_1$-$110_N$ may also be operable to carry out the lower-layer communications necessary to establish a tunnel with a VPN gateway using a proprietary tunneling protocol.

Since computing device 102 includes a plurality of tunneling protocol components, each of which is capable of performing the negotiations necessary to establish a tunnel with a different VPN gateway in accordance with a different tunneling protocol, computing device 102 may be thought of as comprising a "universal client" that can interoperate with a wide variety of different VPN gateway types.

As shown in FIG. 1, in addition to tunneling protocol components $110_1$-$110_N$, computing device 102 also includes a translation engine 112, a connection manager 114, a plurality of applications $116_1$-$116_N$, a user interface component 118, a configuration service provider component 120 and an operating system component 122. It is noted that each of the components of computing device 102 may be implemented in software that is executed by one or more microprocessors, in hardware, or as a combination of software and hardware.

When each of tunneling protocol components $110_1$-$110_N$ first establishes a connection with a VPN gateway, it exchanges messages therewith in order to obtain configuration information (also referred to herein as a payload) from the VPN gateway. As will be appreciated by person skilled in the relevant art(s), the messages that are sent and received as part of this exchange will vary in accordance with the relevant tunneling protocol. For example, the messages that are sent and received may comprise part of a dynamic key exchange in accordance with certain tunneling protocols. The payload received from the VPN gateway includes parameters that are subsequently used by the tunneling protocol component to carry out a communication session with the VPN gateway. Such parameters may include for example, an identification of a subnet that may be used to conduct tunneled communications with the VPN gateway. In some conventional implementations, such parameters are stored only so long as the VPN connection remains active and once the VPN connection is torn down, the parameters are discarded.

Translation engine 112 is a component that is operable to obtain parameters from payloads received from a plurality of different VPN gateways pursuant to establishing a connection therewith in accordance with a respective plurality of different tunneling protocols and to generate a plurality of VPN connection profiles based on the parameters. In particular, translation engine 112 includes post-processing logic that operates to obtain parameters from the tunneling-protocol-specific payloads received by each of tunneling protocol components $110_1$-$110_N$ as part of establishing a VPN connection, and to use such parameters to construct a uniformly-formatted set of non-tunneling-protocol-specific VPN connection profiles. Such profiles are stored so that they persist even after the VPN connections used to build them have been torn down. The post-processing logic in translation engine 112 also maps connection policies to the VPN connection profiles. In this manner, stateless packet filters negotiated by tunneling protocol components $110_1$-$110_N$ are converted into stateful (e.g., policy-aware) VPN connection profiles. The VPN connection profiles are made accessible to configuration manager 114 for use thereby in a manner to be discussed below.

Some examples of how translation engine 112 obtains parameters received during tunneling-protocol-specific payload negotiations conducted by tunneling protocol components $110_1$-$110_N$ to generate stateful VPN connections profiles will now be provided. For example, the following represents an RFC-based CONFIG PAYLOAD negotiation that may be carried out by any one of tunneling protocol components $110_1$-$110_N$.

```
CONFIG PAYLOAD
CFG_REQUEST = ( )
CFG_REPLY = INTERNAL_IP4_SUBNET(10.0.1.0/255.255.255.192)
            INTERNAL_IP4_SUBNET(10.0.2.0/255.255.255.0)
```

In this case, the post-processing logic in translation engine 112 may utilize the parameters returned as part of the CONFIG PAYLOAD negotiation to generate the following VPN connection profiles:

```
{10.0.1.0/26, VPN_INTERFACE, Policies}
{10.0.2.0/24, VPN_INTERFACE, Policies}
```

Thus, it can be seen that translation engine 112 has taken parameters obtained during the CONFIG PAYLOAD negotiation and used such parameters to generate two VPN connection profiles, each of which includes a connection target identifier (in this case an IP address), an indication of the connection type ("VPN_INTERFACE"), and a set of connection policies associated therewith (simply designated "Policies" above).

As another example, the following represents an RFC-based TRAFFIC SELECTOR PAYLOAD negotiation that may be carried out by any one of tunneling protocol components $110_1$-$110_N$.

```
TRAFFIC SELECTOR PAYLOAD
Tsi = (0, 0-65535, 0.0.0.0-255.255.255.255)
Tsr = (0, 0-65535, 0.0.0.0-255.255.255.255)
Tsi = (0, 0-65535, 10.0.1.1-10.0.1.1)
Tsr = ((0, 0-65535, 10.0.1.0-10.0.1.255), (0, 0-65535,
       10.0.2.0-10.0.2.255))
```

In this case, the post-processing logic in translation engine 112 may utilize the parameters returned as part of the TRAFFIC SELECTOR PAYLOAD negotiation to generate the following VPN connection profiles:

```
{10.0.1.0/24, VPN_INTERFACE, Policies}
{10.0.2.0/24, VPN_INTERFACE, Policies}
```

Thus, it can be seen that translation engine 112 has taken parameters obtained during the TRAFFIC SELECTOR PAYLOAD negotiation and used such parameters to generate two VPN connection profiles, each of which includes a connection target identifier (in this case an IP address), an indication of the connection type ("VPN_INTERFACE"), and a set of connection policies associated therewith (simply designated "Policies" above).

It can also be seen that the formats of the VPN connection profiles generated based on the CONFIG PAYLOAD negotiation are the same as the formats of the VPN connection profiles generated based on the TRAFFIC SELECTOR PAYLOAD negotiation, even though the VPN connection profiles were generated based on different tunneling-protocol-specific payload negotiations. Moreover, the VPN connection profiles generated in the manner above are logically abstract in the sense that they do not include any information that is specific or unique to the underlying tunneling protocols that were used to generate them. This advantageously enables other components of computing device 102, such as connection manager 114, to utilize and interpret all of the VPN connection profiles in a like manner without having to have any notion of the underlying tunneling protocols that were used to generate them. This makes development of such other components easier and simplifies the logic thereof.

Connection manager 114 is operable to access the VPN connection profiles generated by translation engine 112 and to enforce the connection policies associated therewith. More particularly, connection manager 114 is a component that operates to assign or otherwise provide remote connections to applications executing on computing device 102 when such applications need to access a remote resource. These applications are shown in FIG. 1 as applications $116_1$-$116_N$. Examples of common applications that may require remote connection include, but by no means are limited to, Internet browsers and customer relationship management (CRM) applications. When an application requires a connection, it places an application programming interface (API) call to connection manager 114 requesting a connection. In response to receiving the request, connection manager 114 determines if a connection can be established to service the request, and if appropriate, establishes a connection on behalf of the application. In an embodiment, this process comprises determining if any of the VPN connection profiles received from translation engine 112 should be used to service the request. This may further include determining if using one or more of the VPN connection profiles to service the request would violate any connection policies associated therewith.

A wide variety of different types of connection policies may be associated with a VPN connection profile in accordance with embodiments. For example, the connection policies may include tariff-based connection policies. Tariff-based connection policies may be thought of as connection policies that are based on managing the economic costs of establishing and maintaining a connection. One example of a tariff-based connection policy is a connection policy that specifies whether or not a connection should be established when computing device 102 is roaming, since the cost of maintaining a connection while roaming is typically more expensive than the cost of maintaining a connection while not roaming Tariff-based connection policies may be based on other cost metrics as well. For example, the cost metric may be whether a current data usage amount for computing device 102 is under, on-track with, or over a particular data limit associated with computing device 102 or a user thereof. Still other cost metrics may be used.

Another type of connection policy that may be associated with a VPN connection profile is one that specifies whether or not a connection should be established over a particular network type or types. Such connection policies can be used to set network routing preferences. For example, such connection policies can specify that connections should or should not be established over a WiFi network, a cellular network, or both, or to prioritize certain network connection types over others.

Still another type of connection policy that may be associated with a VPN connection profile is one that specifies an identity of a proxy server to which data (including certain requests or other types of traffic) sent over the connection should be sent.

Yet another type of connection policy that may be associated with a VPN connection profile is one that specifies whether or not the VPN connection should be automatically established on behalf of the requesting application, as opposed to requiring a user to manually interact with computing device 102 to establish the VPN connection. This functionality is also referred to herein as "auto-triggering." Whether or not a VPN connection is auto-triggered may be determined based on various factors such as the identity of a calling application/process or the identity of the connection target (e.g., a hostname, IP address, or shortname associated with the connection target). Auto-triggering may be set up through the application of an auto-triggering connection policy to a particular VPN connection profile without requiring any additional configuration by the user. In accordance with embodiments, the enforcement of such an auto-triggering connection policy by connection manager 114 means that the user does not have to think about manually connecting to the VPN before accessing an application. Instead, protected applications can essentially drive the auto-triggering behavior of VPN connections.

A further type of connection policy that may be associated with a VPN connection profile is one that specifies whether or not a VPN connection should be established when computing device 102 is already connected to a network that is deemed "trusted." Such a policy can specify whether or not a VPN connection should be established over a trusted network. For example, such a connection policy may state that a VPN connection will not be established when computing device 102 is already connected to an enterprise's Wi-Fi network that would enable the user thereof to obtain a desired resource directly.

In another example, a set of resources may be identified that may override one or more connection policies. Such set of resources may be thought of as a "white list." For example, in accordance with such an embodiment, a VPN connection may always be established to a particular CRM system, even though other connection policies suggest that a VPN connection should not be established.

Still other connection policies not described above may be mapped to VPN connection profiles and enforced by connection manager 114 when servicing requests for connections received from applications $116_1$-$116_N$. Further examples of the generation of VPN connection profiles by translation engine 112, the connection policies that may be associated therewith, and how such connection policies may be enforced by connection manager 114 will be provided below in reference to FIGS. 5-8.

The connection policies that are mapped to VPN connection profiles by translation engine 112 may be received from a variety of sources. For example, connection policies may be received from one or more of user interface component 118, configuration service provider component 120, or operating system component 122 as shown in FIG. 1.

User interface component 118 is operable to enable a user thereof to specify one or more connection policies to be mapped to one or more VPN connection profiles. For example, user interface component 118 may generate a graphical user interface (GUI) that a user may interact with to enable or disable certain connection policies for certain VPN connections or for all VPN connections. Particular example GUIs via which a user can specify connection policies will be described below in reference to FIGS. 9 and 10.

Configuration service provider component 120 is operable to receive from a remote machine one or more connection profiles to be associated with one or more of the VPN connection profiles. For example, the remote machine may be used by a system administrator to provision connection policies to computing device 102 as well as to other computing devices in an enterprise. The remote machine may comprise part of a mobile device management platform. In one embodiment, the connection policies received from the remote machine by configuration service provider component 120 are received in an XML document that is formatted in accordance with an XML-based profile schema, although this example is not intended to be limiting.

Operating system component 122 is operable to determine a state of computing device 102 and to specify one or more connection policies to be associated with one or more of the VPN connection profiles based on the state of the computing device. For example, operating system component 122 may specify a connection policy based on one or more of a data utilization state of computing device 102, an operational state of computing device 102 (e.g., whether computing device 102 is in an active or standby operational state), and a power supply state of computing device 102 (e.g., whether computing device 102 is connected to an external power supply or running off one or more internal batteries, or the amount of charge remaining in one or more internal batteries). By way of example, operating system component 122 may specify that cellular is not to be used for a particular VPN connection profile if it determines that data utilization of computing device 102 exceeds a threshold. As another example, operating system component 122 may specify that a VPN connection should not be established if the charge state of a battery associated with computing device 102 is below a certain threshold (e.g., 25%). The foregoing thresholds may be fixed (i.e., hard coded into the system) or configurable by a user or system administrator via a suitable interface.

Figure 2:
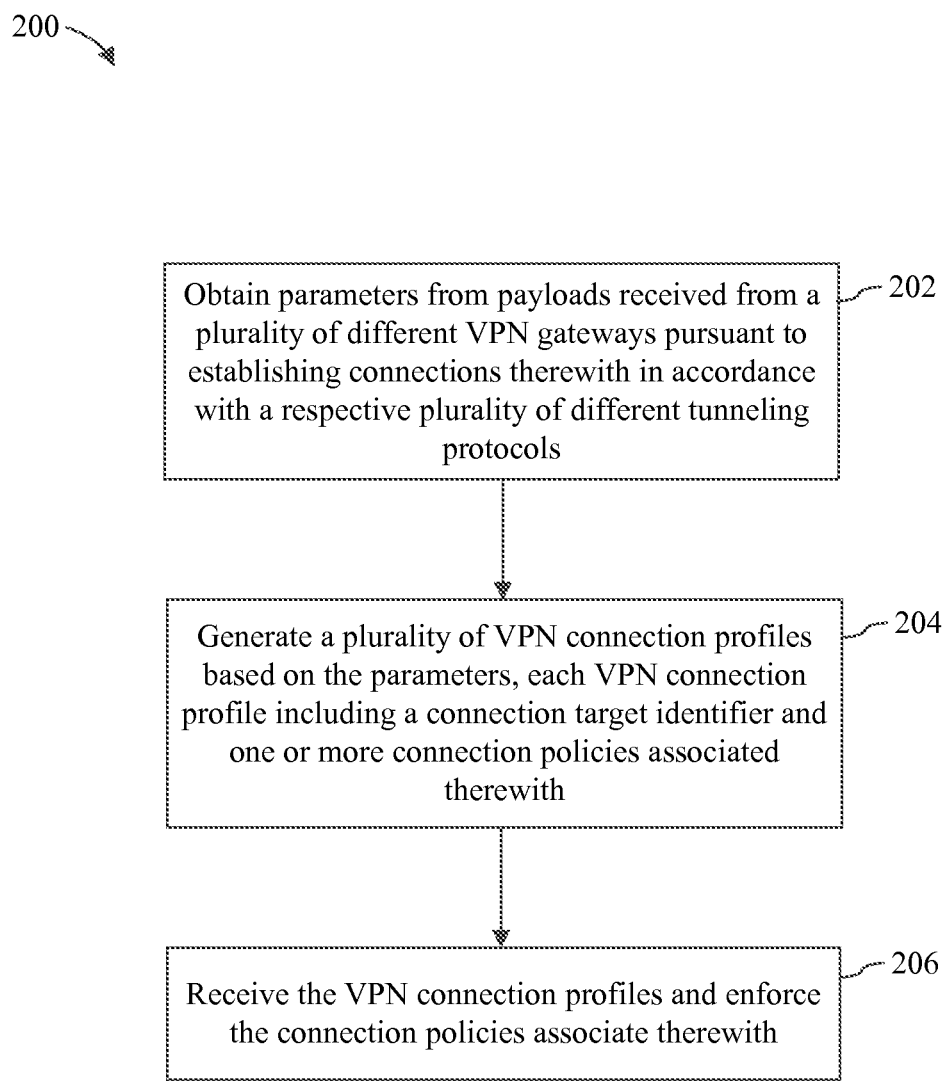
FIG. 2 depicts a flowchart of a method for dynamically generating and utilizing stateful VPN connection profiles in accordance with an embodiment.
Figure 3:
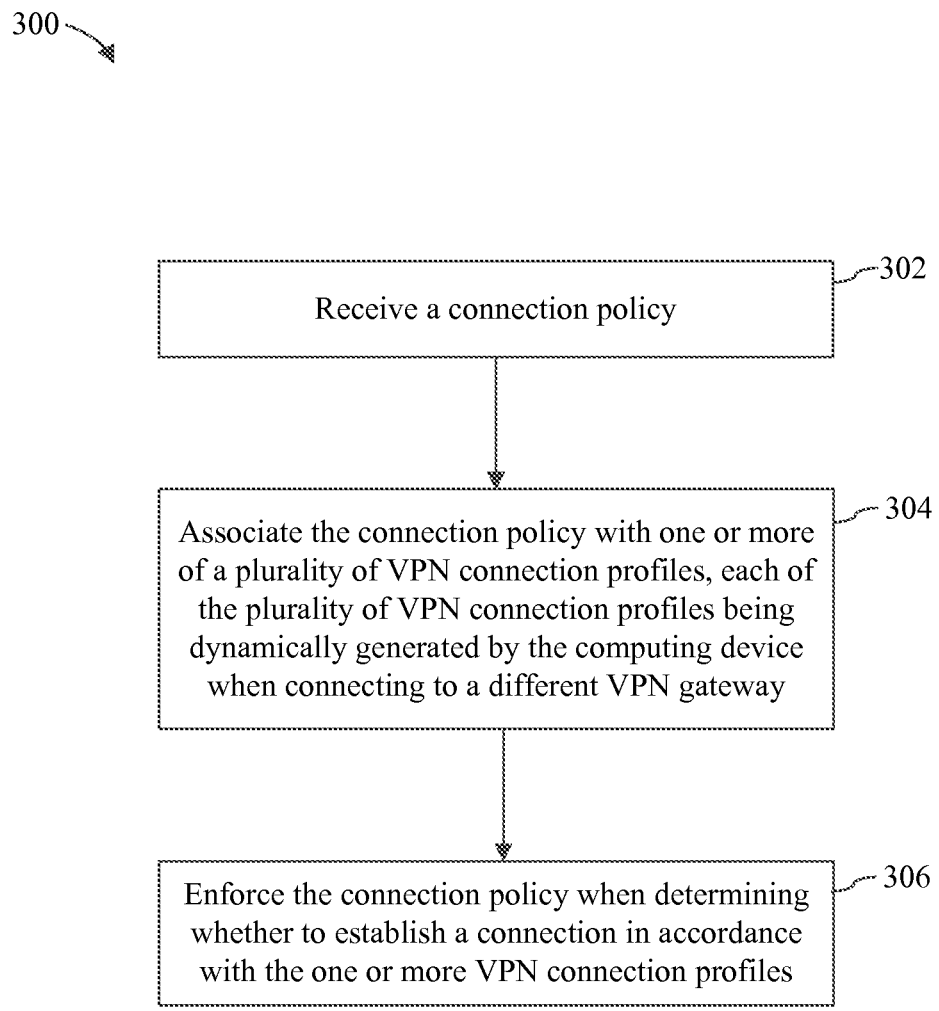
FIG. 3 depicts a flowchart of a method for assigning a connection policy to a dynamically-generated VPN connection profile and enforcing the same in accordance with an embodiment.
Figure 4:
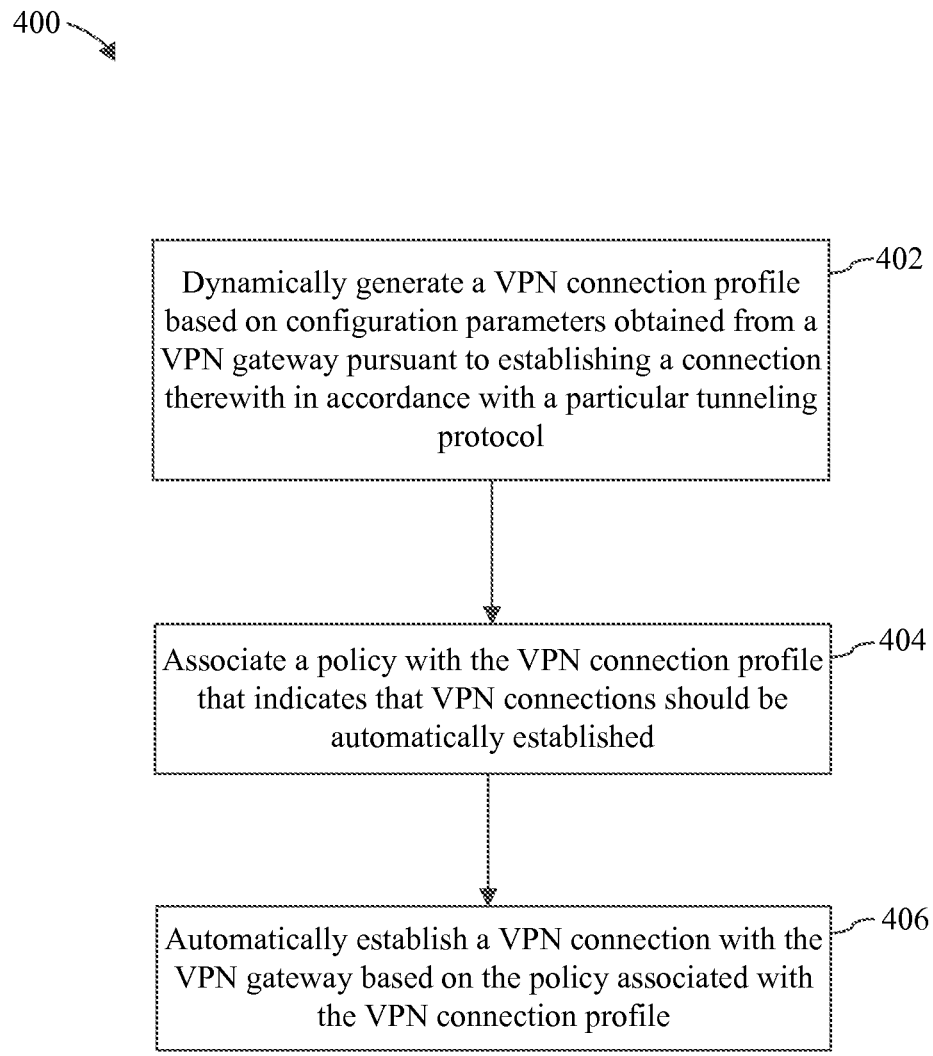
FIG. 4 depicts a flowchart of a method for associating an auto-triggering policy with a dynamically-generated VPN connection profile and enforcing the same in accordance with an embodiment.

The manner in which computing device 102 operates will now be further explained in reference to the flowcharts of FIGS. 2-4. Although the methods of these flowcharts will be described with continued reference to computing device 102 and system 100 of FIG. 1, persons skilled in the relevant art(s) will readily appreciate that such methods can be implemented by other devices and systems entirely.

In particular, FIG. 2 depicts a flowchart 200 of a method for dynamically generating and utilizing stateful VPN connection profiles in accordance with an embodiment. As shown in FIG. 2, the method of flowchart 200 begins at step 202 in which translation engine 112 obtains parameters from payloads received by tunneling protocol components $110_1$-$110_N$ from a plurality of different VPN gateways (e.g., VPN gateways $104_1$-$104_N$) pursuant to establishing connections therewith in accordance with a respective plurality of different tunneling protocols. As noted above, the plurality of different tunneling protocols may include a plurality of standard tunneling protocols (e.g., L2TP, IKE, IKEv2, PPTP, SSTP and/or OpenVPN), a plurality of proprietary tunneling protocols, or a combination of standard and proprietary tunneling protocols. As also noted above, the form and content of the payloads received by tunneling protocol components $110_1$-$110_N$ may vary depending upon the tunneling protocol being used thereby to establish a connection with a VPN gateway. In accordance with one previously-provided example, the payloads may include a CONFIG PAYLOAD and a TRAFFIC SELECTOR PAYLOAD.

At step 204, translation engine 112 generates a plurality of VPN connection profiles based on the parameters. Each VPN connection profile so generated may include a connection target identifier and one or more connection policies associated therewith. In an embodiment, each connection target identifier includes a hostname or an IP address, although these examples are not intended to be limiting and other types of connection target identifiers may be used.

The one or more connection policies referred to in step 204 may include, but are by no means limited to, at least one policy that specifies (1) whether or not a connection should be automatically established, (2) whether or not a connection should be established when the computing device is roaming, (3) whether or not a connection should be established over a particular network type, (4) whether or not a connection should be established based on a cost metric, (5) whether or not a connection should be established over a trusted network, and (6) an identity of a proxy server to which data sent over the connection should be sent.

At step 206, connection manager 114 receives or otherwise accesses the VPN connection profiles generated by translation engine 112 and enforces the connection policies associated therewith. In one embodiment, connection manager 114 enforces the connection policies associated with each VPN connection profile by receiving a request for a connection from an application executing on computing device 102 (e.g., any one of applications $116_1$-$116_N$), and then determining if a VPN connection profile should be used to service the request by determining if using the VPN connection profile would violate any of the policies associated therewith. Connection manager 114 may also enforce a connection policy associated with a VPN connection profile by sending data to a proxy server identified by the VPN connection profile, or by automatically establishing a VPN connection on behalf of an application based on an auto-triggering policy associated with the VPN connection profile.

FIG. 3 depicts a flowchart 300 of a method for assigning a connection policy to a dynamically-generated VPN connection profile and enforcing the same in accordance with an embodiment. As shown in FIG. 3, the method of flowchart 300 begins at step 302 in which translation engine 112 receives a connection policy. As noted above, the connection policy may be received from a variety of sources including but not limited to from a user via user interface component 118 of computing device 102, from a system administrator via a configuration service provider component 120 of computing device 102, or from operating system component 122 of computing device 102. As also noted above, operating system component 122 may determine a state of computing device 102 and specify one or more connection policies based on the determined state. For example and without limitation, the determined state may include one or more of a data utilization state of computing device 102, an operational state of computing device 102, or a power supply state of computing device 102.

The connection policy received during step 302 may specify (1) whether or not a connection should be automatically established, (2) whether or not a connection should be established when the computing device is roaming, (3) whether or not a connection should be established over a particular network type, (4) whether or not a connection should be established based on a cost metric, (5) whether or not a connection should be established over a trusted network, and (6) an identity of a proxy server to which data sent over the connection should be sent.

At step 304, translation engine 112 associates the connection policy with one or more of a plurality of VPN connection profiles, each of the plurality of VPN connection profiles being dynamically generated by computing device 102 when connecting to a different VPN gateway (e.g., any of VPN gateways $104_1$-$104_N$). In an embodiment, each of the plurality of VPN connection profiles is dynamically generated by translation engine 112 of computing device 102 by obtaining one or more parameters from one or more payloads received from each of the different VPN gateways pursuant to establishing a connection therewith in accordance with a different tunneling protocols. As noted above, the plurality of different tunneling protocols may include a plurality of standard tunneling protocols (e.g., L2TP, IKE, IKEv2, PPTP, SSTP and/or OpenVPN), a plurality of proprietary tunneling protocols, or a combination of standard and proprietary tunneling protocols. As also noted above, the form and content of the payloads received by tunneling protocol components $110_1$-$110_N$ may vary depending upon the tunneling protocol being used thereby to establish a connection with a VPN gateway.

At step 306, connection manager 114 enforces the connection policy when determining whether to establish a connection on behalf of an application in accordance with the one or more VPN connection profiles.

FIG. 4 depicts a flowchart 400 of a method for associating an auto-triggering policy with a dynamically-generated VPN connection profile and enforcing the same in accordance with an embodiment. As shown in FIG. 4, the method of flowchart 400 begins at step 402, in which translation engine 112 dynamically generates a VPN connection profile based on configuration parameters obtained from a VPN gateway (e.g., any of VPN gateways $104_1$-$104_N$) pursuant to establishing a connection therewith in accordance with a particular tunneling protocol.

At step 404, translation engine 112 associates a policy with the VPN connection profile that indicates that VPN connections should be automatically established (also referred to herein as an "auto-triggering" policy).

At step 406, connection manager 114 (or some other component within computing device 102) causes a VPN connection to be automatically established with the VPN gateway based on the policy associated with the VPN connection profile. As was noted above, the automatic establishment of the VPN connection may be carried out on behalf of an application without requiring any action by the user. For example, the VPN connection may be established in response to the launching of a particular application. As was also noted above, a determination that the VPN connection is to be automatically established may be made based on various factors such as the identity of a calling application/process or the identity of the connection target (e.g., a hostname, IP address, or shortname associated with the connection target).

The foregoing system 100 and methods 200, 300 and 400 may advantageously be implemented in remote-access VPN deployments as well as site-to-site VPN deployments, thereby enabling both types of deployments to benefit from the application of higher-layer context-specific policies to dynamically-generated VPN profiles, thereby enabling more intelligent and cost-efficient routing.

Further examples of the generation of VPN connection profiles by translation engine 112, the connection policies that may be associated therewith, and how such connection policies may be enforced by connection manager 114 will be provided below in reference to FIGS. 5-8.

In particular, FIG. 5 is a table 500 that includes examples of dynamically-generated VPN connection profiles in accordance with an embodiment. These VPN connection profiles are generated by translation engine 112 based upon the following payload negotiations conducted by one or more of tunneling protocol components $110_1$-$110_N$:

```
CONFIG PAYLOAD:
Request:     CFG_REQUEST = 0
Response:    CFG_REPLY = INTERNAL_IP4_SUBNET
(10.0.1.0/255.255.255.192)
TRAFFIC SELECTOR PAYLOAD:
Request:     TSi = (0, 0-65535, 0.0.0.0-255.255.255.255)
             TSr = (0, 0-65535, 0.0.0.0-255.255.255.0)
Response:    TSi = (0, 0-65535, 10.0.1.1-10.0.1.1)
             TSr = ((0, 0-65535, 10.0.2.1-10.0.2.1))
             TSr = ((0, 0-65535, 10.0.3.0-10.0.3.255))
```

Thus, it can be seen that translation engine 112 has taken parameters obtained during the CONFIG PAYLOAD and TRAFFIC SELECTOR PAYLOAD negotiations and used such parameters to generate the three VPN connection profiles shown in table 500.

In table 500, each VPN connection profile includes a connection target identifier (HOST/IP), a policy indicating whether or not the VPN connection should be automatically triggered (TRIGGER), a connection type (CONNECTION), a policy that indicates whether the VPN connection can be established while computing device 102 is roaming (ROAM_ALLOW), and a policy that indicates which types of network connections are allowed based on cost (COST_ALLOW).

Some example enforcement scenarios will now be described with respect to the example VPN connection profiles shown in table 500. For example, when connecting to 10.0.2.1 and 10.0.1.0/26, the VPN connection will be auto-triggered (i.e., automatically established). That is to say, computing device 102 will automatically connect to the VPN when traffic is sent to these destinations.

When computing device 102 is roaming, the user of computing device 102 can only establish a VPN connection to her company's CRM application with IP address 10.0.2.1. This is because the VPN connection profile for IP address 10.0.2.1 is the only VPN connection profile that allows connections to be established while roaming.

The user of computing device 102 must be on a low-cost network (e.g., Wi-Fi) to connect to her streaming services connecting to servers on network 10.0.3.0/24. This is because the VPN connection profile for network 10.0.3.0/24 only allows low-cost network connections. Note that what constitutes a low-cost network connection is a relative determination and one that may change over time.

FIG. 6 is a table 600 that includes further examples of dynamically-generated VPN connection profiles in accordance with an embodiment. As shown in FIG. 6, connection profiles may be maintained for other types of connections in addition to VPN connections. For example, connection profiles may be maintained for Wi-Fi connections and MMS (Multimedia Messaging Service) connections and policies may be mapped thereto. Table 600 also shows that different types of connection target identifiers may be used in different VPN connection profiles.

FIG. 7 is a table 700 of connection characteristics that can be compared to connection policies associated with dynamically-generated VPN connection profiles to determine whether or not to allow an application to use a connection in accordance with an embodiment. The connection characteristics shown in table 700 may comprise runtime characteristics that are maintained by connection manager 114 and that can change depending on the state of computing device 102. For example, such runtime characteristics may include whether computing device 102 is roaming, what the cost of cellular data is, or the like. Connection manager 114 may compare a policy associated with a particular VPN connection profile against a current connection characteristic to determine whether to allow an application to use the VPN connection or not.

For example, when an application requests a connection to abc.corp.ms.com (see FIG. 6 for the VPN connection profile for this host), connection manager 114 will fail the request because the VPN connection policy for abc.corp.ms.com only allows a VPN connection to be established on a low-cost network, whereas the current VPN connection has a high cost because it is using cellular.

As another example, when an application requests a connection to 10.1.0.50 (also see FIG. 6 for the VPN connection profile for this host), connection manager 114 will allow the request because the VPN connection policy for 10.1.0.50 allows a VPN connection to be established on an any-cost network.

FIG. 8 is another table 800 of connection characteristics that can be compared to connection policies associated with dynamically-generated VPN connection profiles to determine whether or not to allow an application to use a connection in accordance with an embodiment. Table 800 shows the connection characteristics of computing device 102 after the computing device has started roaming—thus, the "ROAM" column for both the VPN and the MSS connection has changed from a "NO" to a "YES." In this scenario, when an application requests a connection to 10.1.0.50, connection manager 114 will fail the request because the VPN connection policy for 10.1.0.50 only allows VPN connections to be established when computing device 102 is not roaming.

Figure 9:
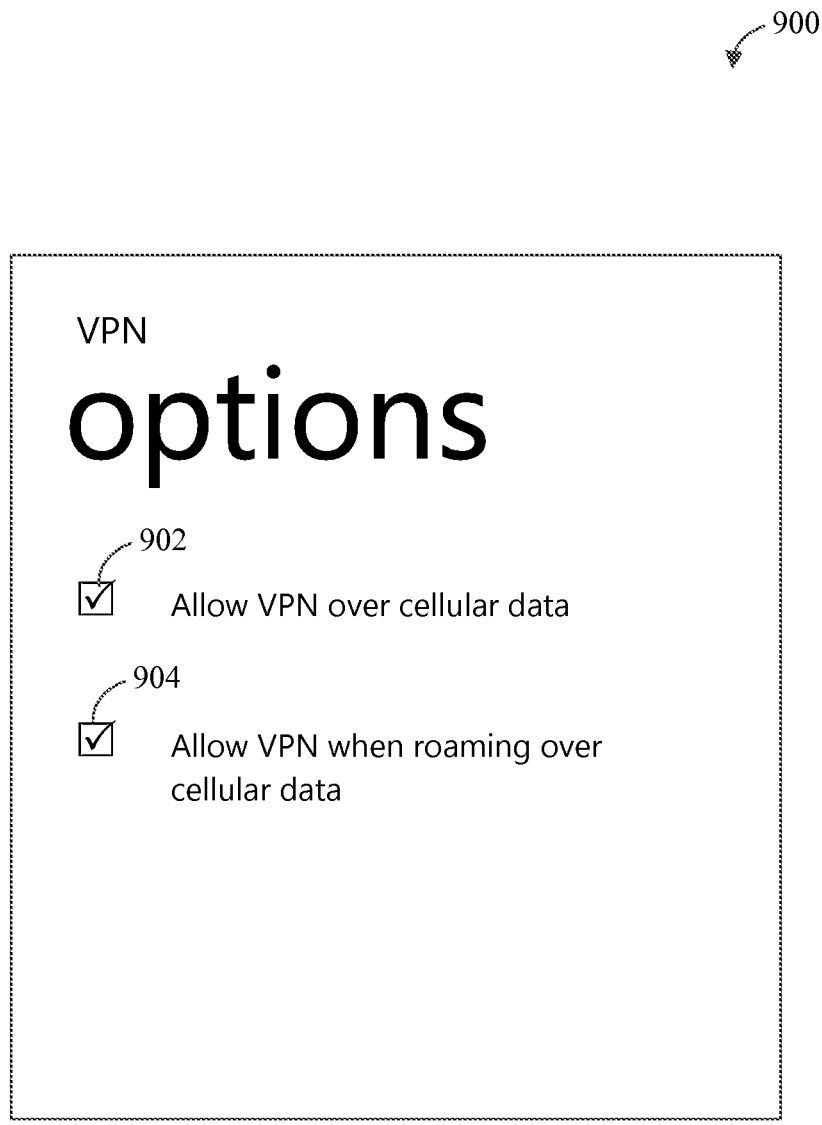
FIG. 9 depicts an example graphical user interface (GUI) that enables a user of a computing device to specify one or more connection policies to be associated with one or more VPN connection profiles in accordance with an embodiment.

FIG. 9 depicts an example GUI 900 that enables a user of a computing device to specify one or more connection policies to be associated with one or more VPN connection profiles in accordance with an embodiment. GUI 900 may be generated by user interface component 118, the operation of which was previously described. As shown in FIG. 9, GUI 900 includes a first checkbox 902 and a second checkbox 904. A user can interact with checkbox 902 to cause it to either checked or unchecked. When checkbox 902 is checked, a policy allowing the establishment of VPN connections over cellular data is applied to the VPN connection profile(s) on computing device 102. When checkbox 902 is unchecked, a policy prohibiting the establishment of VPN connections over cellular data is applied to the VPN connection profile(s) on computing device 102. A user can also interact with checkbox 904 to cause it to be either checked or unchecked. When checkbox 904 is checked, a policy allowing the establishment of VPN connections when roaming over cellular data is applied to the VPN connection profile(s) on computing device 102. When checkbox 904 is unchecked, a policy prohibiting the establishment of VPN connections when roaming over cellular data is applied to the VPN connection profile(s) on computing device 102.

Figure 10:
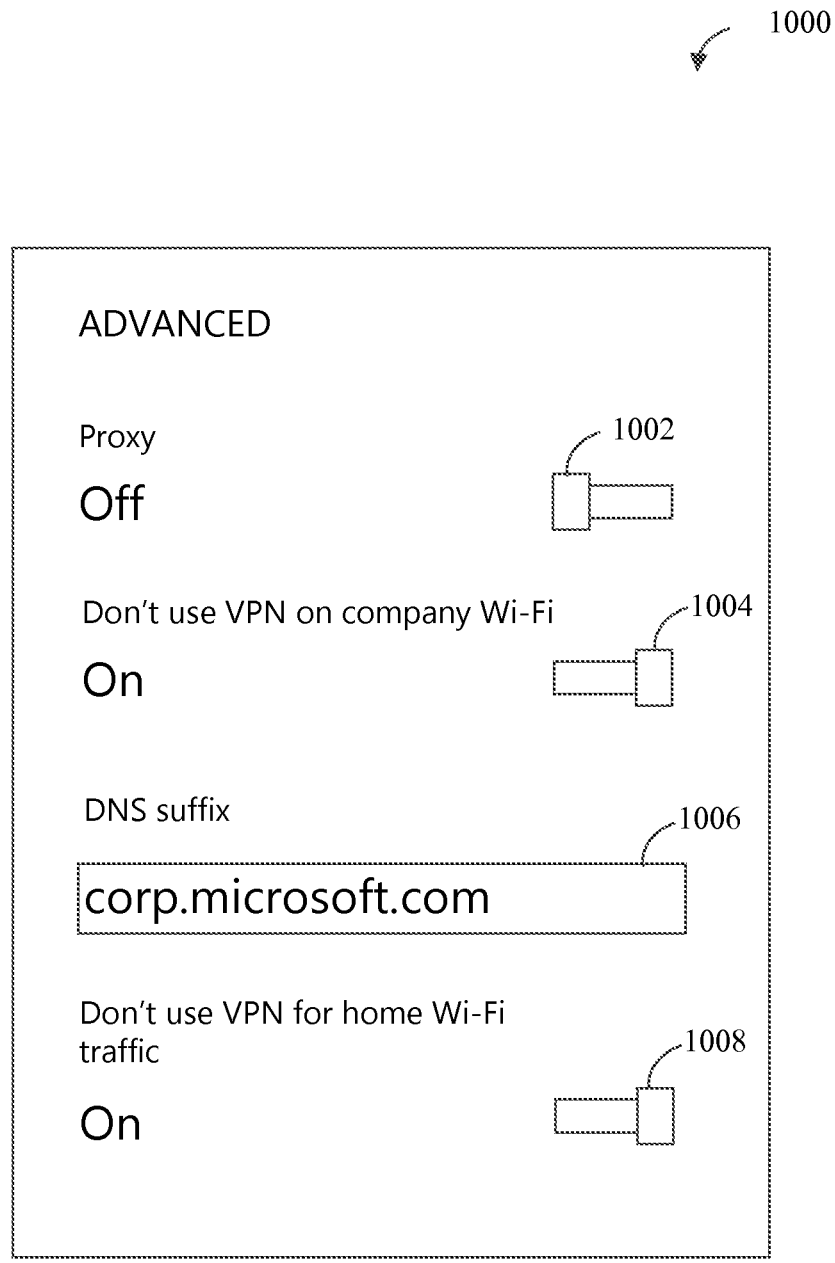
FIG. 10 depicts another example GUI that enables a user of a computing device to specify one or more connection policies to be associated with one or more VPN connection profiles in accordance with an embodiment.

FIG. 10 depicts another example GUI 1000 that enables a user of a computing device to specify one or more connection policies to be associated with one or more VPN connection profiles in accordance with an embodiment. GUI 1000 may be generated by user interface component 118, the operation of which was previously described. As shown in FIG. 10, GUI 1000 includes a first switch 1002, a second switch 1004, a text box 1006, and a third switch 1006.

A user can interact with first switch 1002 to place first switch 1002 in an on or off position. When first switch 1002 is in the on position, a policy that data sent over the VPN connection should be sent to a proxy server is applied to the VPN connection profile(s) on computing device 102. When first switch 1002 is in the off position, a policy that data sent over the VPN connection should be sent to a proxy server is not applied to the VPN connection profile(s) on computing device 102.

A user can interact with second switch 1004 to place second switch 1004 in an on or off position. When second switch 1004 is in the on position, a policy that VPN connections should not be established over a company's Wi-Fi network is applied to the VPN connection profile(s) on computing device 102. When second switch 1004 is in the off position, a policy that VPN connections may be established over the company's Wi-Fi network is applied to the VPN connection profile(s) on computing device 102.

Text box 1006 may be used to specify a DNS suffix used for establishing a VPN connection. The DNS suffix may be associated with a VPN connection profile stored on computing device 102.

A user can interact with third switch 1006 to place third switch 1006 in an on or off position. When third switch 1006 is in the on position, a policy that VPN connections should not be established for home Wi-Fi traffic is applied to the VPN connection profile(s) on computing device 102. When third switch 1006 is in the off position, a policy that VPN connections may be established for home Wi-Fi traffic is applied to the VPN connection profile(s) on computing device 102.

The example GUIs shown in FIGS. 9 and 10 illustrate only a few types of connection policies that may be specified by a user of a computing device. A wide variety of other connection policies may be specified by a user and associated with one or more VPN connection profiles in accordance with other embodiments.

III. Example Mobile Device Implementation

Figure 11:
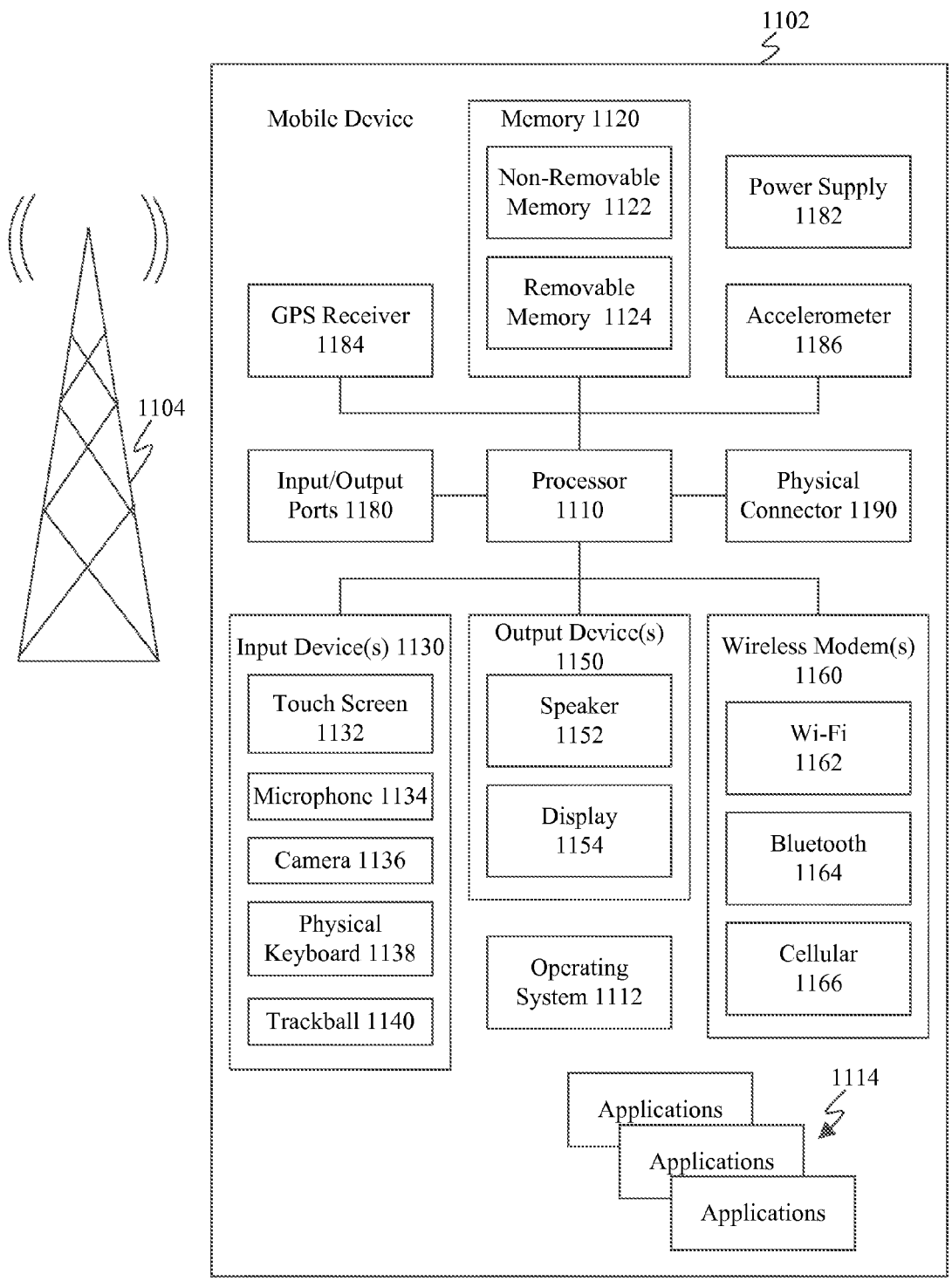
FIG. 11 is a block diagram of an example mobile device that may be used to implement various embodiments.

FIG. 11 is a block diagram of an exemplary mobile device 1102 that may implement embodiments described herein. As shown in FIG. 11, mobile device 1102 includes a variety of optional hardware and software components. Any component in mobile device 1102 can communicate with any other component, although not all connections are shown for ease of illustration. Mobile device 1102 can be any of a variety of computing devices (e.g., cell phone, smartphone, handheld computer, Personal Digital Assistant (PDA), etc.) and can allow wireless two-way communications with one or more mobile communications networks 1104, such as a cellular or satellite network, or with a local area or wide area network.

The illustrated mobile device 1102 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components of mobile device 1102 and support for one or more application programs 1114 (also referred to as "applications" or "apps"). Application programs 114 may include common mobile computing applications (e.g., e-mail applications, calendars, contact managers, Web browsers, messaging applications) and any other computing applications (e.g., word processing applications, mapping applications, media player applications).

The illustrated mobile device 1102 can include memory 1120. Memory 1120 can include non-removable memory 1122 and/or removable memory 1124. Non-removable memory 1122 can include RAM, ROM, flash memory, a hard disk, or other well-known memory devices or technologies. Removable memory 1124 can include flash memory or a Subscriber Identity Module (SIM) card, which is well known in GSM communication systems, or other well-known memory devices or technologies, such as "smart cards." Memory 1120 can be used for storing data and/or code for running operating system 1112 and applications 1114. Example data can include Web pages, text, images, sound files, video data, or other data to be sent to and/or received from one or more network servers or other devices via one or more wired or wireless networks. Memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1102 can support one or more input devices 1130, such as a touch screen 1132, a microphone 1134, a camera 1136, a physical keyboard 1138 and/or a trackball 1140 and one or more output devices 1150, such as a speaker 1152 and a display 1154. Touch screens, such as touch screen 1132, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens.

Other possible output devices (not shown) can include piezoelectric or other haptic output devices. Some devices can serve more than one input/output function. For example, touch screen 1132 and display 1154 can be combined in a single input/output device. The input devices 1130 can include a Natural User Interface (NUI).

Wireless modem(s) 1160 can be coupled to antenna(s) (not shown) and can support two-way communications between the processor 1110 and external devices, as is well understood in the art. The modem(s) 1160 are shown generically and can include a cellular modem 1166 for communicating with the mobile communication network 1104 and/or other radio-based modems (e.g., Bluetooth 1164 and/or Wi-Fi 1162). At least one of the wireless modem(s) 1160 is typically configured for communication with one or more cellular networks, such as a GSM network for data and voice communications within a single cellular network, between cellular networks, or between the mobile device and a public switched telephone network (PSTN).

Mobile device 1102 can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components of mobile device 1102 are not required or all-inclusive, as any components can be deleted and other components can be added as would be recognized by one skilled in the art.

In an embodiment, certain components of mobile device 1102 are configured to perform the functions described herein relating to the dynamic generation of stateful VPN profiles and the use of such profiles for connection management. For example, in one embodiment, operating system 1112 and/or other software stored on mobile device 1102 includes components (such as tunneling protocol components 110$_1$-110$_N$, translation engine 112, connection manager 114, user interface component 118, configuration service provider component 120, and operating system component 122) that are capable of performing the functions described above for the dynamically generating stateful VPN profiles and using such profiles for managing connection requests from applications 1114. However, this is only an example and different functions may be performed by different components.

Computer program logic for performing the functions described herein relating to the dynamic generation of stateful VPN profiles and the use of such profiles for connection management may be stored in memory 1120 and executed by processor 1110. By executing such computer program logic, processor 1110 may be caused to implement any of the features of any of the components of computing device 102 as described above in reference to FIG. 1. Also, by executing such computer program logic, processor 1110 may be caused to perform any or all of the steps of any or all of the flowcharts depicted in FIGS. 2-4.

IV. Example Computer System Implementation

Figure 12:
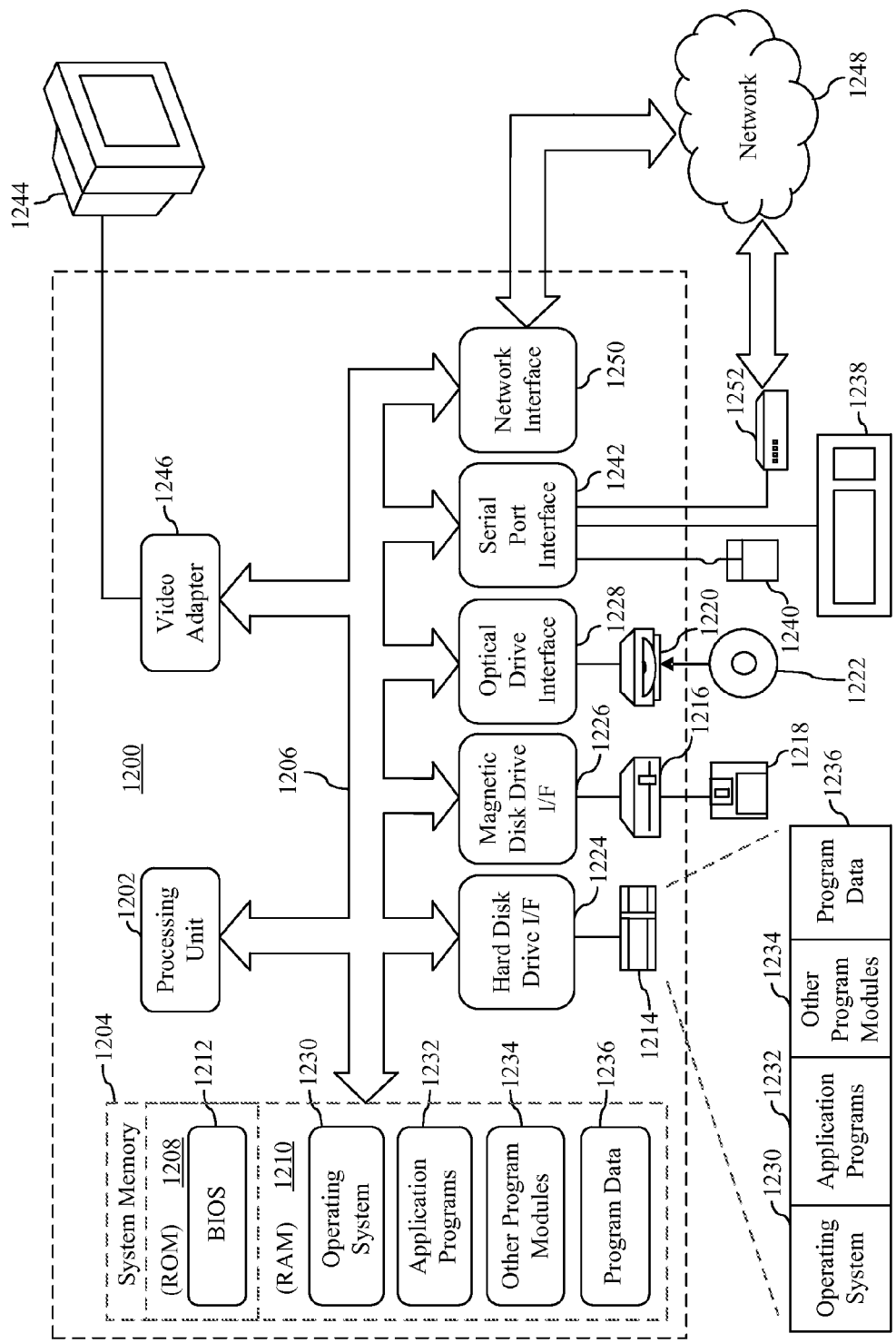
FIG. 12 is a block diagram of an example processor-based computer system that may be used to implement various embodiments.

FIG. 12 depicts an example processor-based computer system 1200 that may be used to implement various embodiments described herein. For example, system 1200 may be used to implement any of the components of computing device 102 as described above in reference to FIG. 1. System 1200 may also be used to implement any or all of the steps of any or all of the flowcharts depicted in FIGS. 2-4. The description of system 1200 provided herein is provided for purposes of illustration, and is not intended to be limiting. Embodiments may be implemented in further types of computer systems, as would be known to persons skilled in the relevant art(s).

As shown in FIG. 12, system 1200 includes a processing unit 1202, a system memory 1204, and a bus 1206 that couples various system components including system memory 1204 to processing unit 1202. Processing unit 1202 may comprise one or more microprocessors or microprocessor cores. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

System 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, BLU-RAY™ disk or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1230, one or more application programs 1232, other program modules 1234, and program data 1236. In accordance with various embodiments, the program modules may include computer program logic that is executable by processing unit 1202 to perform any or all of the functions and features of computing device 102 as described above in reference to FIG. 1. The program modules may also include computer program logic that, when executed by processing unit 1202, performs any of the steps or operations shown or described in reference to the flowcharts of FIGS. 2-4.

A user may enter commands and information into system 1200 through input devices such as a keyboard 1238 and a pointing device 1240. Other input devices (not shown) may include a microphone, joystick, game controller, scanner, or the like. In one embodiment, a touch screen is provided in conjunction with a display 1244 to allow a user to provide user input via the application of a touch (as by a finger or stylus for example) to one or more points on the touch screen. These and other input devices are often connected to processing unit 1202 through a serial port interface 1242 that is coupled to bus 1206, but may be connected by other interfaces, such as a parallel port, game port, or a universal serial bus (USB). Such interfaces may be wired or wireless interfaces.

A display 1244 is also connected to bus 1206 via an interface, such as a video adapter 1246. In addition to display 1244, system 1200 may include other peripheral output devices (not shown) such as speakers and printers.

System 1200 is connected to a network 1248 (e.g., a local area network or wide area network such as the Internet) through a network interface or adapter 1250, a modem 1252, or other suitable means for establishing communications over the network. Modem 1252, which may be internal or external, is connected to bus 1206 via serial port interface 1242.

As used herein, the terms "computer program medium," "computer-readable medium," and "computer-readable storage medium" are used to generally refer to memory devices or storage structures such as the hard disk associated with hard disk drive 1214, removable magnetic disk 1218, removable optical disk 1222, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1232 and other program modules 1234) may be stored on the hard disk, magnetic disk, optical disk, ROM, or RAM. Such computer programs may also be received via network interface 1250, serial port interface 1242, or any other interface type. Such computer programs, when executed or loaded by an application, enable computer 1200 to implement features of embodiments of the present invention discussed herein. Accordingly, such computer programs represent controllers of the system 1200.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1200 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system implemented on a computing device, comprising:
    at least one processor; and
    memory that is accessible by the at least one processor, the memory storing components for execution by the at least one processor, the components including:
        a translation engine operable to obtain parameters from payloads received from a plurality of different virtual private network (VPN) gateways pursuant to establishing connections therewith in accordance with a respective plurality of different tunneling protocols, and to generate a plurality of uniformly-formatted, non-tunneling-protocol-specific VPN connection profiles based on the parameters, each VPN connection profile including a connection target identifier and one or more connection policies associated therewith; and
        a connection manager operable to receive the VPN connection profiles generated by the translation engine and to enforce the connection polices associated therewith.

2. The system of claim 1, wherein the plurality of different tunneling protocols comprises a plurality of standard tunneling protocols, a plurality of proprietary tunneling protocols, or a combination of standard and proprietary tunneling protocols.

3. The system of claim 2, wherein the standard tunneling protocols comprise one or more of:
    a Layer 2 Tunneling Protocol;
    an Internet Key Exchange Protocol;
    a Point-to-Point Tunneling Protocol;
    a Secure Sockets Tunneling Protocol; and
    an OpenVPN Tunneling Protocol.

4. The system of claim 1, wherein at least one of the payloads is received from one of the VPN gateways as part of a dynamic key exchange protocol.

5. The system of claim 1, wherein each connection target identifier comprises a hostname or an Internet Protocol (IP) address.

6. The system of claim 1, wherein the one or more connection policies includes at least one policy that specifies:
    whether or not a connection should be automatically established;
    whether or not a connection should be established when the computing device is roaming;
    whether or not a connection should be established over a particular network type;
    whether or not a connection should be established based on a cost metric;
    whether or not a connection should be established over a trusted network; and
    an identity of a proxy server to which data sent over the connection should be sent.

7. The system of claim 1, wherein the connection manager is operable to enforce the connection policies associated with each VPN connection profile by:
    receiving a request for a connection from an application executing on the computing device; and
    determining if a VPN connection profile should be used to service the request by determining if using the VPN connection profile would violate any of the policies associated therewith.

8. The system of claim 1, wherein the components further include:
    a user interface component operable to enable a user of the computing device to specify one or more connection policies to be associated with one or more of the VPN connection profiles.

9. The system of claim 1, wherein the components further include:
    a configuration service provider component operable to receive from a system administrator one or more connection policies to be associated with one or more of the VPN connection profiles.

10. The system of claim 1, wherein the components further include:
    an operating system component operable to determine a state of the computing device and to specify one or more connection policies to be associated with one or more of the VPN connection profiles based on the state of the computing device.

11. The system of claim 10, wherein the state of the computing device comprises one or more of:
    a data utilization state of the computing device;
    an operational state of the computing device; and
    a power supply state of the computing device.

12. A method performed by a computing device, comprising:
    receiving a connection policy;
    associating the connection policy with one or more of a plurality of uniformly-formatted, non-tunneling-protocol-specific virtual private network (VPN) connection profiles, each of the plurality of VPN connection profiles being dynamically generated by the computing device when connecting to a different VPN gateway; and
    enforcing the connection policy when determining whether to establish a connection in accordance with the one or more VPN connection profiles.

13. The method of claim 12, wherein receiving the connection policy comprises:
- receiving the connection policy from a user via a user interface component of the computing device;
- receiving the connection policy from a system administrator via a configuration service provider component of the computing device; or
- receiving the connection policy from an operating system component of the computing device, the connection policy being provided by the operating system component based on a determined state of the computing device.

14. The method of claim 13, wherein the determined state of the computing device comprises one or more of:
- a data utilization state of the computing device;
- an operational state of the computing device; and
- a power supply state of the computing device.

15. The method of claim 12, wherein the connection policy specifies:
- whether or not a connection should be automatically established;
- whether or not a connection should be established when the computing device is roaming;
- whether or not a connection should be established over a particular network type;
- whether or not a connection should be established based on a cost metric;
- whether or not a connection should be established over a trusted network; or
- an identity of a proxy server to which data sent over the connection should be sent.

16. The method of claim 12, wherein each of the plurality of VPN connection profiles is dynamically generated by the computing device by obtaining one or more parameters from one or more payloads received from each of the different VPN gateways pursuant to establishing a connection therewith in accordance with a different tunneling protocol.

17. The method of claim 16, wherein the different tunneling protocols comprise a plurality of standard tunneling protocols, a plurality of proprietary tunneling protocols, or a combination of standard and proprietary tunneling protocols.

18. The method of claim 17, wherein the standard tunneling protocols comprise one or more of:
- a Layer 2 Tunneling Protocol;
- an Internet Key Exchange Protocol;
- a Point-to-Point Tunneling Protocol;
- a Secure Sockets Tunneling Protocol; and
- an OpenVPN Tunneling Protocol.

19. A computer program product comprising a computer-readable memory having computer program logic recorded thereon that when executed by at least one processor causes the at least one processor to perform operations, the computer program logic comprising:
- first computer program logic that, when executed by the at least one processor, causes the at least one processor to dynamically generate a non-tunneling-protocol-specific virtual private network (VPN) connection profile based on configuration parameters obtained from a VPN gateway pursuant to establishing a connection therewith in accordance with a particular tunneling protocol;
- second computer program logic that, when executed by the at least one processor, causes the at least one processor to associate a policy with the VPN connection profile that indicates that VPN connections should be automatically established; and
- third computer program logic that, when executed by the at least one processor, causes the at least one processor to automatically establish a VPN connection with the VPN gateway based on the policy associated with the VPN connection profile.

20. The computer program product of claim 19, wherein the policy indicates that VPN connections should be automatically established based on one of:
- an application or process identifier;
- an Internet Protocol (IP) address associated with the VPN gateway;
- a hostname associated with the VPN gateway; or
- a short name associated with the VPN gateway.

* * * * *